United States Patent
Bhuyan

(10) Patent No.: US 12,382,144 B2
(45) Date of Patent: Aug. 5, 2025

(54) MEDIA PROGRAM VIEWERSHIP MEASUREMENT USING BLOCKCHAINS

(71) Applicant: ARRIS Enterprises LLC, Suwanee, GA (US)

(72) Inventor: Sudeepta Bhuyan, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 18/378,585

(22) Filed: Oct. 10, 2023

(65) Prior Publication Data
US 2024/0155206 A1 May 9, 2024

Related U.S. Application Data

(63) Continuation of application No. 17/190,287, filed on Mar. 2, 2021, now abandoned.

(Continued)

(51) Int. Cl.
*H04N 7/173* (2011.01)
*H04N 21/2347* (2011.01)
(Continued)

(52) U.S. Cl.
CPC ....... *H04N 21/643* (2013.01); *H04N 21/2347* (2013.01); *H04N 21/8456* (2013.01)

(58) Field of Classification Search
CPC ............ H04N 21/643; H04N 21/2347; H04N 21/8456; H04N 21/44204; H04N 21/2407;
(Continued)

(56) References Cited

U.S. PATENT DOCUMENTS 8,082,486 B1 12/2011 Damman et al.
11,153,073 B2 * 10/2021 Rice ................ H04L 9/0637
(Continued)

FOREIGN PATENT DOCUMENTS

CN 109525865 A 3/2019

OTHER PUBLICATIONS

International Search Report and Written Opinion Re: Application No. PCT/US2021/020535 (dated Jun. 11, 2021).

*Primary Examiner* — Benjamin R Bruckart
*Assistant Examiner* — Sahar Aqil Riaz
(74) *Attorney, Agent, or Firm* — Chernoff, Vilhauer, McClung & Stenzel, LLP

(57) ABSTRACT

A method, apparatus, and system for measuring consumption of content data having content for serially presentation is presented. The method comprises generating n random numbers, where n>0, generating a first value $P_1$ at least in part from a cryptographic function of the n random numbers, publishing the first value $P_1$ to a smart contract associated with a blockchain, embedding consumption monitoring data comprising the n random numbers in different temporal locations of the content data and transmitting the content data to a client device for consumption. A client device extracts each of the n random and transmits the extracted n random numbers to the smart contract associated with the blockchain. A smart contract verifies that the n random numbers match the embedded n random numbers and executes a transaction of the smart contract.

16 Claims, 4 Drawing Sheets

Related U.S. Application Data

(60) Provisional application No. 62/984,645, filed on Mar. 3, 2020.

(51) Int. Cl.
*H04N 21/643* (2011.01)
*H04N 21/845* (2011.01)

(58) Field of Classification Search
CPC ..... H04H 60/31; H04L 9/0662; H04L 9/3239; H04L 9/50
USPC .......................................................... 725/110
See application file for complete search history.

(56) References Cited

U.S. PATENT DOCUMENTS

| | | | |
|---|---|---|---|
| 11,375,292 B2 | 6/2022 | Woodeman et al. | |
| 11,924,524 B2 * | 3/2024 | Thompson | H04N 21/835 |
| 2017/0308681 A1 | 10/2017 | Gould et al. | |
| 2018/0121635 A1 * | 5/2018 | Tormasov | H04L 9/3236 |
| 2018/0343505 A1 | 11/2018 | Loheide et al. | |
| 2019/0236286 A1 | 8/2019 | Scriber et al. | |
| 2019/0266632 A1 | 8/2019 | Milford et al. | |
| 2019/0354943 A1 | 11/2019 | Mulye et al. | |
| 2019/0362388 A1 | 11/2019 | Bugga et al. | |
| 2020/0052917 A1 * | 2/2020 | Corral | H04L 67/53 |
| 2020/0058019 A1 | 2/2020 | Navin et al. | |
| 2020/0126114 A1 | 4/2020 | Kuo et al. | |
| 2020/0175590 A1 | 6/2020 | Huo | |
| 2020/0192957 A1 | 6/2020 | Augustine et al. | |
| 2020/0237452 A1 | 7/2020 | Wolf et al. | |
| 2020/0244444 A1 | 7/2020 | Sun et al. | |
| 2020/0351103 A1 * | 11/2020 | Hardy | H04L 63/123 |
| 2021/0021407 A1 * | 1/2021 | Weerasinghe | H04L 9/3218 |
| 2021/0182827 A1 * | 6/2021 | Mohen | G06Q 20/367 |

* cited by examiner

MEDIA PROGRAM VIEWERSHIP MEASUREMENT USING BLOCKCHAINS

CROSS-REFERENCE TO RELATED APPLICATIONS

This application is a continuation of U.S. patent application Publication Ser. No. 17/190,287 filed Mar. 2, 2021, which claims benefit of U.S. Provisional Patent Application No. 62/984,645, entitled "MEDIA PROGRAM VIEWERSHIP MEASUREMENT USING BLOCKCHAINS," by Sudeepta Bhuyan, filed Mar. 3, 2020, which application is hereby incorporated by reference herein.

BACKGROUND

1. Field

The present disclosure relates to systems and methods for measuring viewership demographics, and in particular to a system and method for verifiably measuring media program viewership demographics via blockchains.

2. Description of the Related Art

The dissemination of program content is typically commercially supported by the use of sponsored advertisement content presented in conjunction with the program content. The value of such advertisements is largely related to the "reach" of the program content transmission, which provides information about the individuals actually consuming (e.g. watching) the content. Such information may include simply the number of people watching the content, but may also include additional detail such as the demographics of the audience. Typically, the more individuals watching or consuming the program content, the more valuable the advertisement opportunities that are associated with the transmission of the program content. The number of individuals watching particular content is also important information for other reasons. For example, it informs content providers as to the number and demographics of the viewers of their content, permitting them to favor production of more popular content over less popular content. It is also important to determine which advertising content is actually presented.

Current linear TV viewership/audience measurement techniques are based on surveys and extrapolations from sampled data. For example, Nielsen ratings seek to determine audience sizes and composition in television programming in the United States using a rating system. In the past, this information was obtained via paper diaries that were completed by individuals selected by the Nielsen firm. Viewers sent in the paper diaries or respond to phone calls to collect information. Later, electronic data collection techniques were used, including the use of set meters, which gathered information regarding which channels (and by inference, which content) were being watched at which times at the household. Still later, other electronic data collection techniques were used, including devices incorporated into set top boxes (STBs) and digital video recorders (DVRs), so that time shifted viewing of media programs could be accounted for. Such systems are probabilistic in nature, and thus may not provide information of sufficient detail or accuracy.

With the advent of pull-based paradigms such as over the top (OTT) dissemination (e.g. by the Internet) of content, it is possible to obtain viewing information and demographics by placing a "tag" into the streamed content and tracking the tag to determine if and when the content is consumed. However, in more traditional push type delivery paradigms (e.g. broadcast), it is more difficult to accurately measure audience viewership That is because OTT content delivered over HTTP/HLS can be tracked by the backend by simply keeping a track of all the HTTP requests coming from the client. However for broadcast, there is no notion of client request. The clients tune to a channel locally without talking to the backend.

It is also not unusual for viewership numbers to be misrepresented or fraudulently reported. For example, as described in the Appendix, one technique is to "retitle" an episode of a series (e.g. using a slightly different name) when the episode is expected to have fewer viewers, so that the average viewership numbers for the series is not negatively affected by the viewership drop of that episode. For example, if an episode of THE SIMPSONS is expected to be less because of the broadcast of a popular sporting program, that particular episode may be retitled as THE SIMPSON'S so that it is not counted in the aggregated statistics for the series.

What is needed is a system and method for verifiably monitoring the viewership of content, so that the determined number of viewers of the content is incremented if and only if the consumer device presenting the content is able to prove that it has indeed presented that particular content for viewing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An apparatus, method and system for measuring consumption of content data having content for serially presentation is disclosed. The method comprises generating n random numbers, where n>0, generating a first value $P_1$ at least in part from a cryptographic function of the n random numbers, publishing the first value $P_1$ to a smart contract associated with a blockchain, embedding consumption monitoring data including the n random numbers in different temporal locations of the content data and transmitting the content data to a client device for consumption. A client device extracts each of the n random numbers only after a portion of the content data associated with a temporal location of the associated random number has been consumed and transmits the extracted n random numbers to the smart contract associated with the blockchain. A smart contract verifies, that the transmitted extracted n random numbers match the embedded n random numbers from the published first value $P_1$ and a second value $P_2$ generated from the extracted n random numbers and executes a transaction of the smart contract only if the transmitted extracted n random numbers match the embedded n random numbers.

Another embodiment is evidenced by a system for measuring consumption of content data having content for serially presentation. The system comprises a content producer processor and a content producer memory, communicatively coupled to the content producer processor. The content producer memory storing content producer instructions including instructions for generating n random numbers, where n>0, generating a first value $P_1$ at least in part from a cryptographic function of the n random numbers, publishing the first value $P_1$ to a smart contract associated with a blockchain, and embedding consumption monitoring data comprising the n random numbers in different temporal locations of the content data. The system also includes a transmitter, for transmitting the content data to a client device for consumption, and a client device having a client device processor and a client device memory, storing client device instructions including instructions for extracting each of the n random numbers only after a portion of the content data associated with a temporal location of the associated random number has been consumed and transmitting the extracted n random numbers to the smart contract associated with the blockchain. The system also includes a verification processor, a verification memory, storing verification processor instructions comprising instructions for verifying, that the transmitted extracted n random numbers match the embedded n random numbers from the published first value $P_1$ and a second value $P_2$ generated from the extracted n random numbers and automatically executing a transaction of the smart contract only if the transmitted extracted n random numbers match the embedded n random numbers.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Content Distribution System

Figure 1:
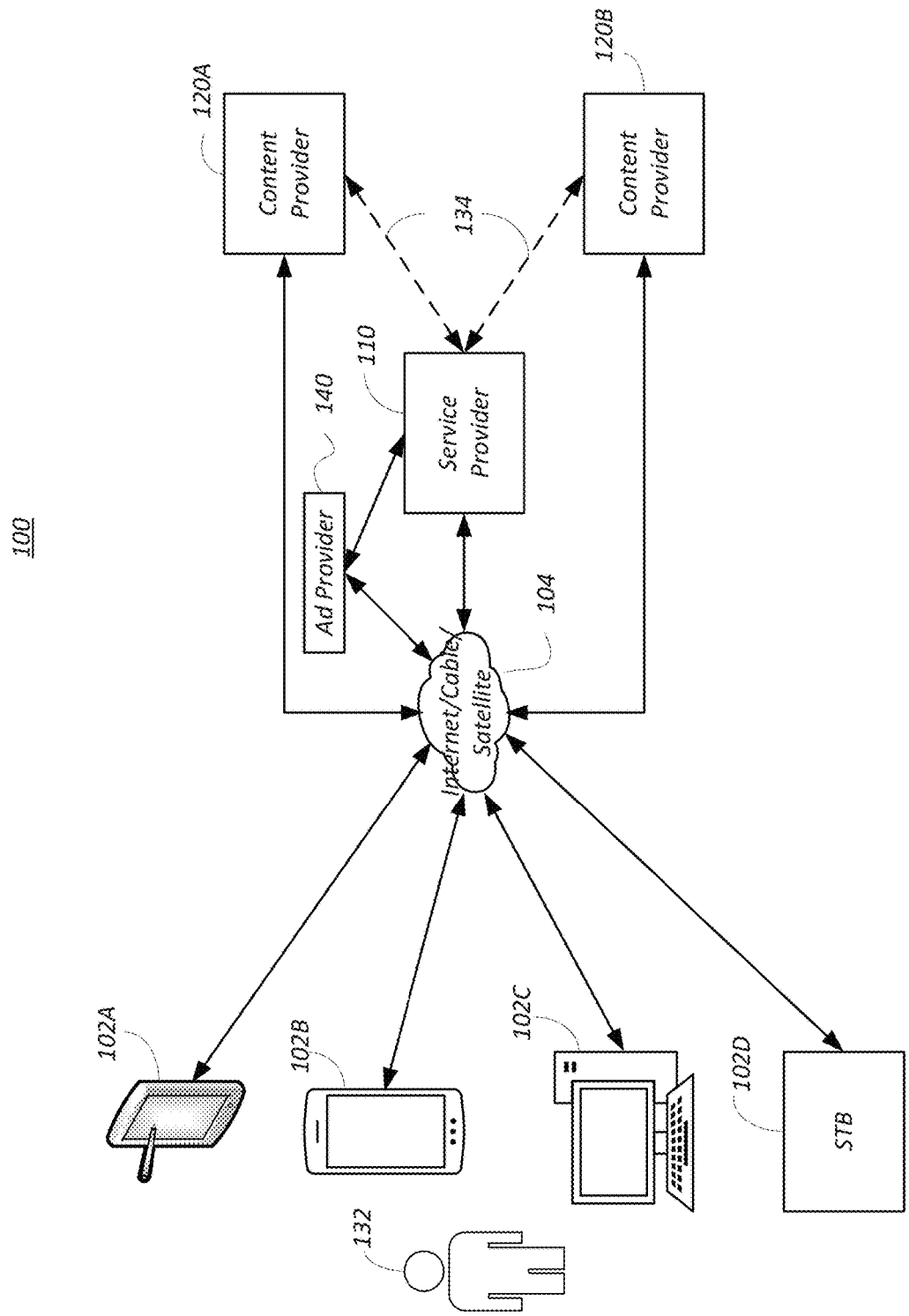
FIG. 1 is a diagram illustrating an exemplary content distribution system.

FIG. 1 is a diagram illustrating an exemplary content distribution system (CDS) 100. In the illustrated embodiment, the system 100 may comprise one or more content providers 120A, 120B (hereinafter, content provider(s) 120), in communication with a communication network 104 such as the Internet, cable system, or satellite system.

The content distribution system (CDS) 100 transmits content data having content to one or more client devices such as content consumption devices (CCDs) 102A-202D. Such CCDs 102 may include a tablet 102A, a smartphone 102B, a desktop or laptop computer 102C and/or a set top box (STB) 102D. CCDs 102 may both be enabled to receive content from the service provider 110 or directly from the content providers 120.

Typically, content providers 120 own the rights to the media programs (alternatively referred to hereinafter as "content" ultimately presented to consumers. Content providers 120 may own such rights because they created the content itself, or by transfer of rights from the authors or former owners of the content.

In one service paradigm, content providers 120 transmit content to service providers 110 (typically over high bandwidth secure communication links 134), and the services providers 110 transmit the content to the CCDs 102. In another service paradigm, the content providers 120 transmit content directly to CCDs 102. In the first service paradigm, the service provider 110 licenses the content from the content providers 120. In the second service paradigm, such licensing is not required.

The content providers 120 and service providers 110 each may include one or more video servers and one or more databases for storing and transmitting content. Content providers 120 and service providers 110 may transmit content data to the CCDs 102 via the Internet, cable transmission system, satellite transmission system, or terrestrial transmission, and such transmission may comprise a broadcast (e.g. transmission to any CCD 102 via a communication channel shared by the CCDs 102, multicast (e.g. transmission to a pre-specified group of CCDs 102), or by OTT video-on-demand and/or streaming.

The content data transmitted to CCDs 102 includes the content itself (e.g. the video and audio data that together comprise the program of content) as well as other data appurtenant to the content provided to the CCD 102 and used to support the decompression and decoding of the content or otherwise present the content. Such appurtenant data can include, for example, clock references, program identifiers, conditional access data and the like.

Using the CCDs 102, remote users 132 can also communicate data with the service provider(s) 110 or content provider(s) 120 using the communication network 104.

The CDS 100 may also comprise one or more advertisement providers 140, which supply advertising content that is presented conjunction with the content, typically at intervals within the content. In the illustrated embodiment, the advertisement provider 140 includes an advertisement provider server communicatively coupled to an associated and communicatively coupled advertisement provider database.

Overview

To achieve the goal of allowing an entity such as the content provider 120, service provider 110 or advertising provider 140 to determine that media content has been played by the CCDs 102, entity creates a puzzle that can only be solved with data provided by a CCD 102 that has actually played the content. The viewership count is then determined from the number of times the puzzle has been solved by different CCDs 102. In this system, the CCDs 102 do not operate as blockchain nodes, and do not run any blockchain node software. Rather, they operate like wallet clients which can send transactions to a blockchain network. This technique can be used in any transmission paradigm, including broadcast, multicast, or OTT.

Blockchains and Smart Contracts

A blockchain is a list or ledger of records (blocks) that are serially linked using cryptography. Each block typically contains a cryptographic hash of the previous block, a timestamp, and transaction data (generally represented as a Merkle Tree. The ledger is distributed and open, and is typically managed by a peer-to-peer network. Once recorded, the data in a given block of the blockchain cannot be altered retroactively without alteration of all subsequent blocks, which cannot be performed without a majority of entities in the network agreeing to the change.

Figure 2:
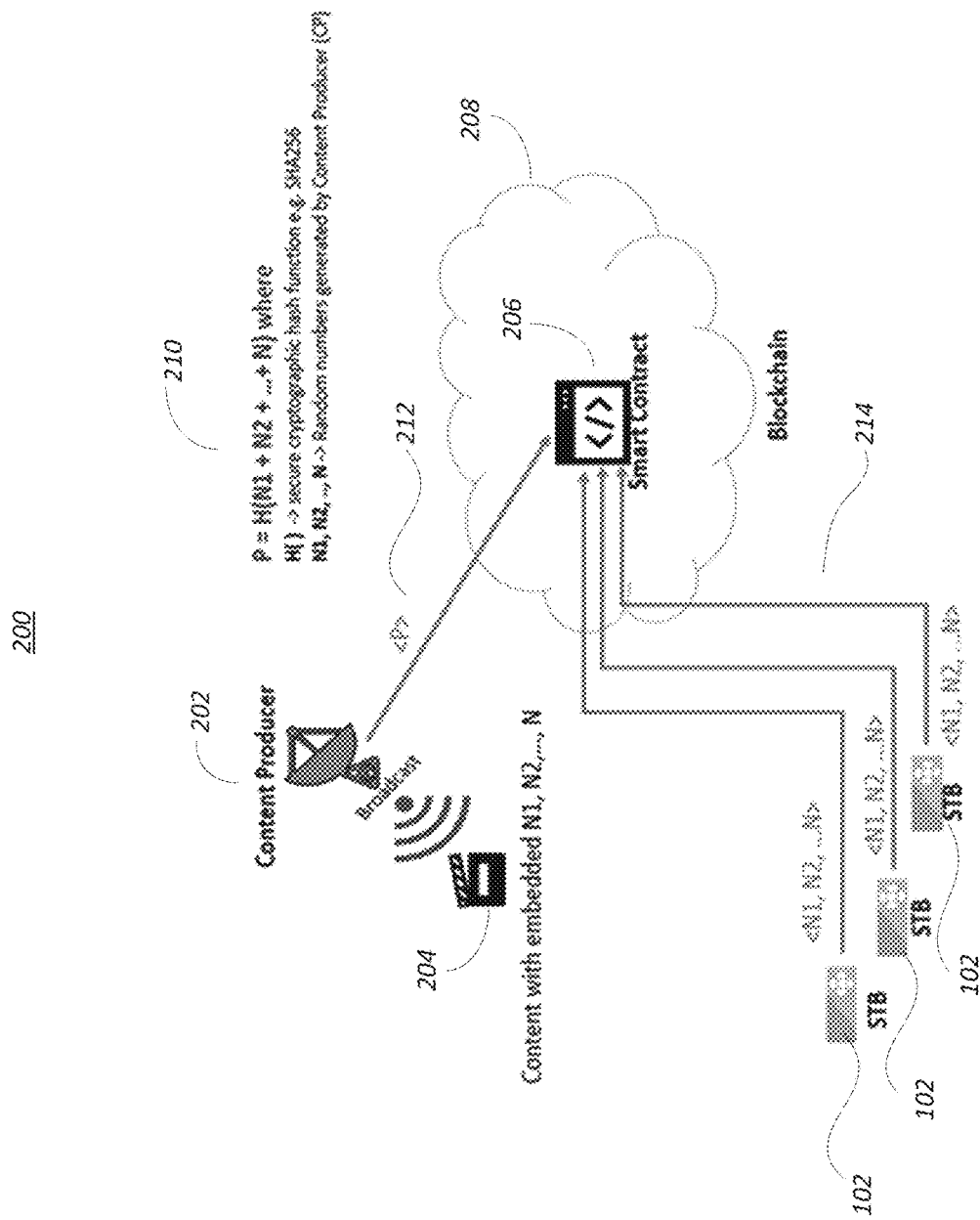
FIG. 2 is a diagram presenting an overview of a blockchain-based viewership monitoring system.

A smart contract is a self-enforcing agreement embedded in computer code managed by a blockchain. The code contains a set of rules under which the parties to that contract agree to interact with one another. If and when the pre-defined rules are met, the agreement is automatically enforced. Essentially, smart contracts operate like a cryptographic box that contains value, and only unlocks if certain conditions are met. The underlying values and access rights they manage are stored on a blockchain, which is a transparent, shared ledger. The transparent, shared nature of the blockchain protects transactions from being deleted, revised or tampered with FIG. 2 is a diagram presenting an overview of a blockchain-based viewership monitoring system 200. Viewership information is recorded on a blockchain using a smart contract 206, thereby making that viewership information immutable and tamperproof and visible to all stakeholders, including content providers, service providers, advertising providers, and media program sponsors. Both the CCDs 102 and the content data (e.g. which has been embedded with pseudorandom numbers) being currently displayed play an indispensable role in the measurement process, and the viewership count is incremented if and only if the CCD 102 is able to prove that has indeed played that particular content. This is accomplished by defining a puzzle 210 having a puzzle solution P generated from a plurality of random or pseudorandom values (alternatively referred to hereinafter as numbers) $N_1+N_2+ \ldots +N_n$. The random numbers $N_1+N_2+ \ldots +N_n$ are inserted into the content data where they can be recovered by the CCD 102 and provided to a smart contract 206 of a blockchain 208.

The puzzle 210 and the pseudorandom numbers $N_1+N_2+ \ldots +N_n$ are selected such that the pseudorandom numbers $N_1+N_2+ \ldots +N_n$ will only reliably generate the value of P if the CCD 102 has recovered all of the plurality of numbers $N_1+N_2+ \ldots +N_n$ from the content data 204.

In one embodiment, the puzzle comprises at least one cryptographic function of a combination of pseudorandom numbers, for example, as shown in equation (1) below:

$$P=f_{crypto}(N_1+N_2+ \ldots +N_n) \qquad \text{Equation (1)}$$

Equation (1) describes the use of only one cryptographic function, but a plurality of cryptographic functions may be utilized, for example, as described in Equation (2).

$$P=f_{crypto1}(N_1+N_2+ \ldots +N_{n-m})+f_{crypto2}(N_m+N_{m+1}+ \ldots +N_n) \qquad \text{Equation (2)}$$

Preferably, the cryptographic function ($f_{crypto}$) is deterministic, can be computed rapidly, and is such that it is infeasible to generate the same output for the function with different inputs, and that small changes in the input results in function value that appears to be uncorrelated with that of the unchanged input value. In one embodiment, the cryptographic function is a one-way hash function.

In an exemplary embodiment, the puzzle for the CCD 102 to solve is to compute puzzle solution P from n random numbers that are provided in the media content, as described in equation (3) below:

$$P=\text{Hash}(N_1+N_2+ \ldots +N_n) \qquad \text{Equation (3)}$$

wherein:
Hash( ) is a secure one-way cryptographic hash function such as SHA256,
$N_1, N_2, \ldots, N_n$ are the n random numbers generated by the content producer 202; and
the operation "+" refers to a combination operation such that x+y is a combination of x and y.

The "+" operation may comprise any combination of x and y. Examples include an exclusive OR operation (XOR), a bitwise OR, a bitwise AND, and a concatenation of digits representing the values of x and y.

In a bitwise OR operation, the result is obtained by taking a bit by bit exclusive OR of the value of each digit. For example, if x=10 and y=7 in base 10, the bitwise OR of x and y is a bit by bit exclusive or of 1010 and 0110, which is 1101. A bitwise AND operation is similar, with the result obtained via a bit by bit AND operation (in the above example, resulting in a value of 0010). A concatenation of digits in the above example would yield 10100110. Other operations combining the operands x and y may also be used.

The puzzle 210 is used to measure viewership as follows. Prior to the transmission of the media content, the content producer 202 (e.g. the content provider 120 or advertising provider 140) generates n random numbers $N_1, N_2, \ldots, N_n$ and computes the puzzle solution $P_1$ using those random numbers, for example, using Equation (3). These numbers may be expressed using any combination of value representations including alphanumeric characters. The content producer 202 then commits/publishes the value of P 212 onto a blockchain 208 using a dedicated smart contract 206. Blockchain 208 and smart contract 206 operations (described further below) are performed by a processing system, with the resulting blockchain shared among other computers in a network.

The content producer 202 embeds the n random numbers inside the content data at random or specific intervals. For example, in embodiments wherein the content data is transmitted in a serially presented MPEG2 transport stream (TS) having packets that include an adaptation field, each random number N can be embedded in the content data as private data inside the adaptation field of the TS packet, along with an optional unique media content identifier. Other techniques can be used to transmit the n random numbers, including inserting the random numbers into other unused data fields in the content data, or inserting the data into the content itself, for example using steganographic or similar techniques. The unique media content identifier allows the content that is the subject of the viewership survey to be identified, so the puzzle solution can be compared to the proper puzzle solution computed by the content producer 202.

When each CCD 102 plays back the content, it parses the content data and retrieves the embedded random numbers $N_1, N_2, \ldots, N_n$ from the transmission of the content, and transmits the retrieved random numbers to the smart contract 206 via communication channel 214. The smart contract 206 computes the puzzle value P 2 from the numbers $N_1, N_2, \ldots, N_n$ it receives from the CCD 102 and determines whether the computed puzzle value $P_2$ equals the puzzle value $P_1$ received from the content producer 202 (e.g., it satisfies P=Hash ($N_1+N_2+ \ldots +N_n$)). The viewership count of the content is incremented by one if and only if the value of P received from the content producer 202 matches the value computed from the numbers $N_1, N_2, \ldots, N_n$ received from the CCD 102.

Figure 3:
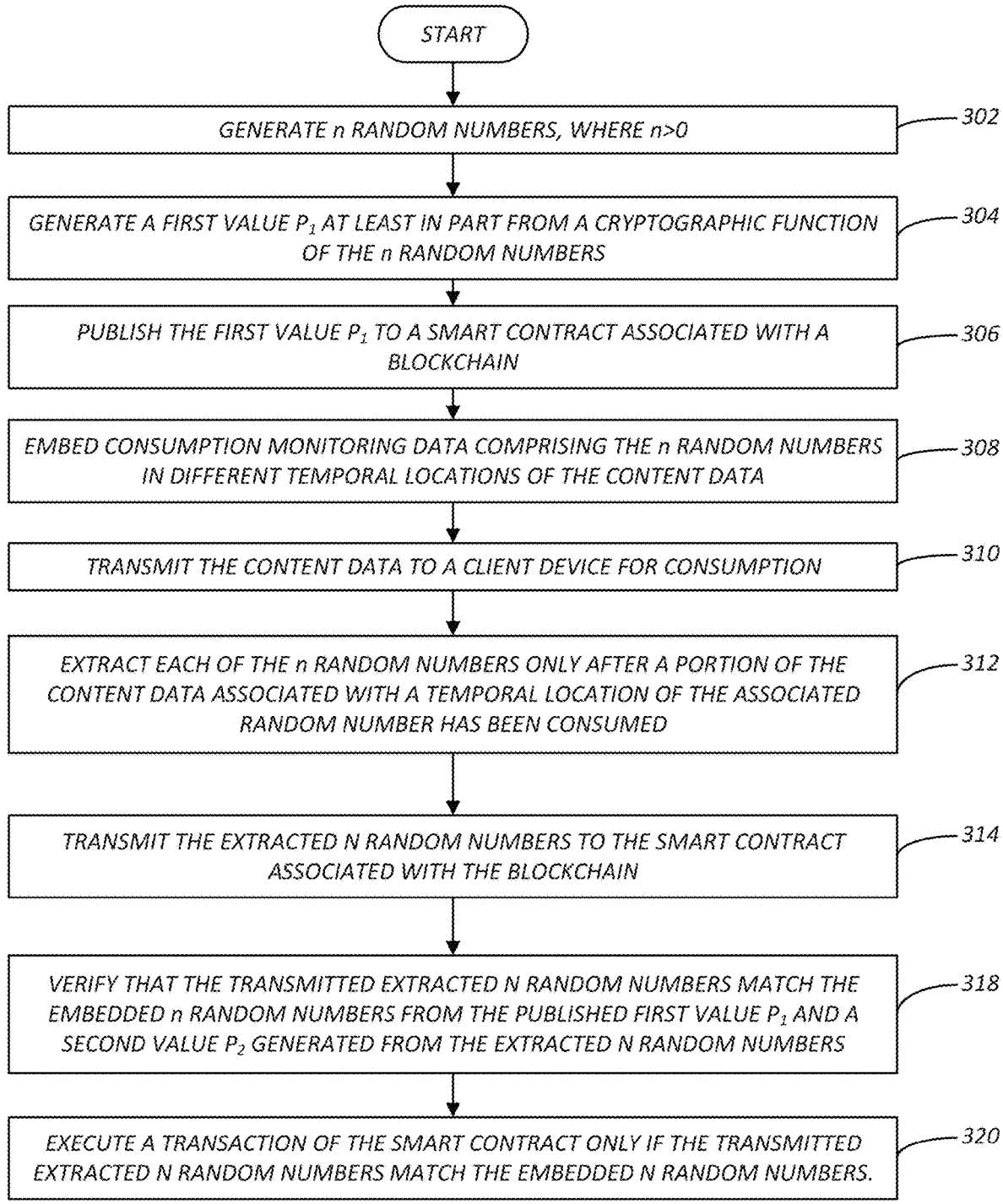
FIG. 3 is a diagram presenting further details regarding operation of the blockchain-based viewership monitoring system.

FIG. 3 is a diagram presenting further details regarding operation of the blockchain-based viewership monitoring system 200. In block 302, n random numbers are generated, where N is an integer greater than zero. A first value $P_1$ is generated at least in part from a cryptographic function of one or more of the generated n random numbers, as shown in block 304. The values of the N random numbers are held private, but the content producer publishes the first value $P_1$ to the smart contract 206 associated with the blockchain 208, as shown in block 306.

In block 308, consumption monitoring data comprising the n random numbers is embedded in different temporal locations of the content data. The consumption monitoring data includes the generated n random numbers, but may include other information as further described below. The consumption monitoring data may be embedded in data appurtenant to the data that carries image and sound information, or in the image and sound information itself. For example, the random numbers can be embedded in the data that carries the image information using steganography, or modifying the least significant bits of an image pixel). In another example, in embodiments wherein the content is transmitted in a MPEG2 TS stream, each random number N may be embedded in the content data as private data inside the adaptation field of the TS packet, along with an optional unique content identifier or other information. In still further example, the information may be embedded in unused closed captioning closed captioning, or multi-dimensional sound. In embodiments wherein the content data complies with the HTTP live streaming transmission protocol (HLS), one of the random numbers N may be embedded in each HLS-coded chunk of the content data.

In block 310, the content data 204 with the embedded random numbers is transmitted (e.g. by broadcast) to the CCDs 102. The CCD 102 receives the content data 204, and extracts each of the N random numbers from the content data 204, as shown in block 312. The extracted random numbers are transmitted to the smart contract 206 associated with the blockchain 208, as shown in block 314.

In block 318, the smart contract 206 verifies the CCD 102 has presented the content by verifying that the transmitted extracted n random numbers match the embedded n random numbers. This is accomplished by generating a second puzzle value $P_2$ from the transmitted extracted random numbers and comparing that generated second puzzle value P2 with the puzzle value P1 received from the content producer 202.

Finally, in block 320, the smart contract 206 executes a transaction of the smart contract only if the transmitted extracted n random numbers match the embedded random numbers (i.e. the computed puzzle value P2 matches the puzzle value P1 received from the content producer 202.

In one embodiment, each random number is extracted from the content data and transmitted essentially immediately after extraction. In another embodiment, each random number is transmitted only after that portion of the content data associated with a temporal location of the associated random number has been consumed (e.g. decrypted, decompressed, decoded). In still further embodiments, random numbers can be aggregated and sent in a group, with each group of random numbers providing information by which it can be determined whether the associated portion of the content has been consumed. For example, it is typical for ordinary broadcast television to begin with a commercial break, have a second commercial break after the first third of the program, a third commercial break after the second third of the program, and a fourth commercial break after the program has completed. The content producer 202 may generate different random numbers for the first, second and last thirds of the program, as well as associated different puzzle values. The CCDs 102 may transmit the random numbers for each of the program thirds when the viewing of those thirds are completed (or as they are completed), thus indicating which thirds of the program has been consumed.

It is further possible for the content producer 202 to generate multiple puzzle solutions, each requiring more of the random numbers to be solved. For example, the content producer 202 may define three puzzles:

$$P_a = f_{crypto}(N_1 + N_2 + \ldots + N_4) \qquad \text{Equation (4)}$$

$$P_b = f_{crypto}(N_1 + N_2 + \ldots + N_5) \qquad \text{Equation (5)}$$

$$P_c = f_{crypto}(N_1 + N_2 + \ldots + N_6) \qquad \text{Equation (6)}$$

and send the solution to each puzzle to the smart contract 206. As the CCD 102 reproduces and presents the content, the value of $P_a$ can be determined after the CCD has extracted and transmitted $N_1, N_2 \ldots N_4$ but cannot determine the value of $P_b$ until the $N_5$ has been extracted and transmitted. In this way, one set of random numbers can be used to determine viewership of a single program of content, but that viewership can be determined for cumulative portions of the content.

Secure Communication of Random Numbers to the Smart Contract

In many older blockchains 208 the transaction details are public (e.g. Ethereum), and if an CCD 102 simply sends the list of random numbers that it has collected in a transaction to the smart contract 206, the values will be known to all with access to the network. Hence, it is possible for a malicious entity to monitor the communication channels 214 to find a valid series of random numbers $N_1, N_2, \ldots, N_n$ from an uncompromised, non-malicious CCD 102, and then simply send one or more transactions with the same random number values, thus inflating the viewership count. To prevent this problem (known as transaction frontrunning), newer blockchains 208 have support for transaction privacy, using techniques such as zero knowledge proofs. In this example, the CCD 102 would provide proof that it has extracted the random numbers without actually providing the random numbers to the smart contract 206. In this case, the CCDs 102 may compute the value for $P_2$ and prove that they have computed this number, rather than transmitting the number $P_2$ itself. The smart contract would then execute the transaction based on this proof.

A zero knowledge proof is a means by which one entity can prove to another entity that they know the value of a variable without disclosing the value of the variable itself. Essentially, proof that the value of the variable is known without disclosing the variable is performed by the second entity solving a problem that can only be solved if the value of the variable is known, without the disclosing the value, and using a problem that does not disclose anything about the value. For example, to prove knowledge of the variable x the first entity can perform the computation $y = g^x \mod p$ and transmit the result y to the second entity. The first entity can then calculate a random value $C = g^r \mod p$ where r is a random number, p is a large prime number and g is a generator, and transmit the result C to the second entity. The second entity can request that the first entity transmit the value r. Using this value r, the second entity can confirm that the first entity knows the value of y by confirming that $C = g^r \mod p$. Another way to prevent this problem is to use a cryptographic primitive such as a commit reveal scheme.

Hardware Environment

Figure 4:
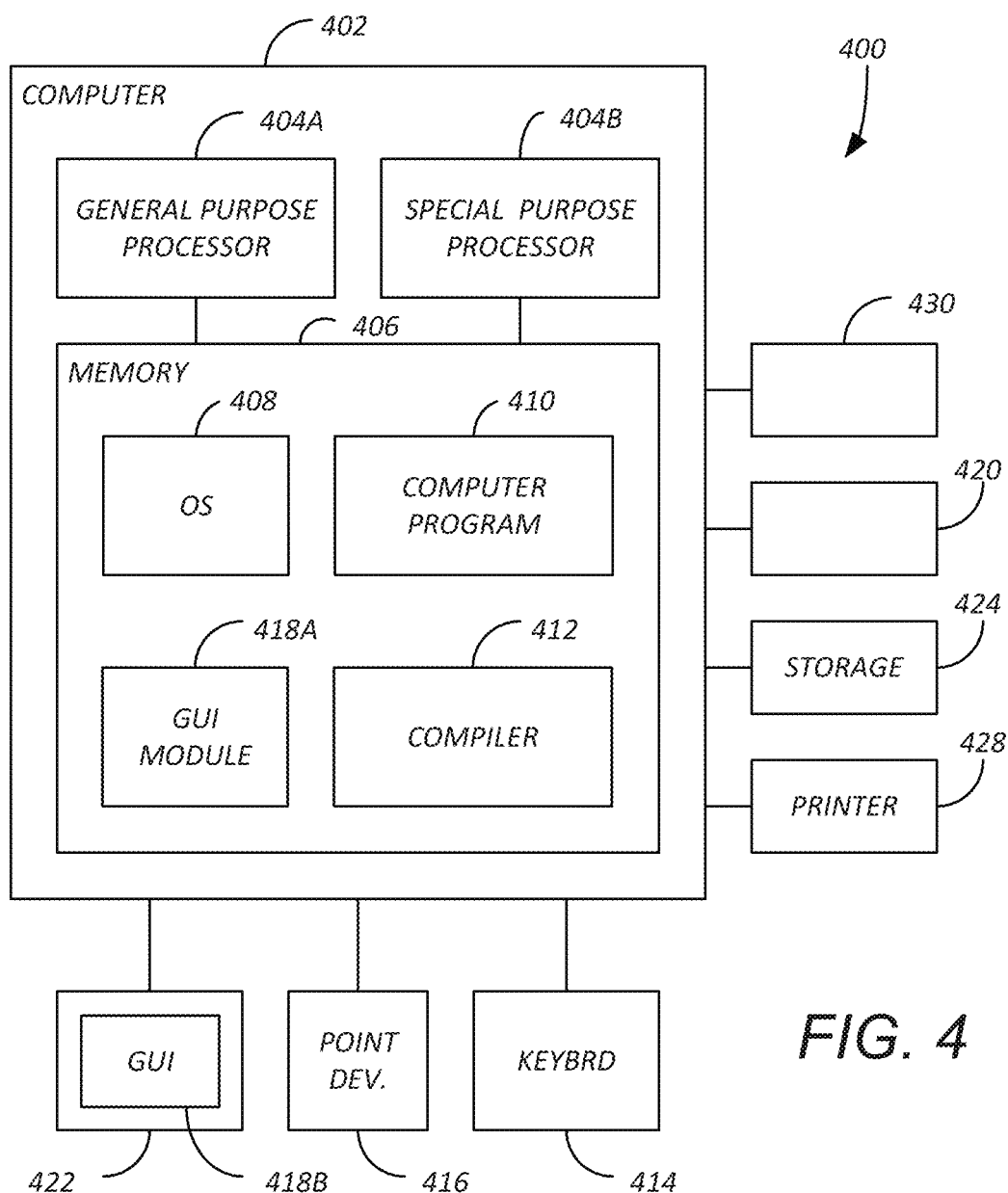
FIG. 4 illustrates an exemplary processing system that could be used to implement processing elements of this disclosure.

FIG. 4 illustrates an exemplary processing system 400 that could be used to implement processing elements of the above disclosure, including the operations of blocks 302-320 of FIG. 3. Similar processing elements can be used to generate the blockchain 208, disseminate the blockchain ledger to other processing systems in the network, enforce the smart contract 206.

A computer 402 comprises one or more processors such as general purpose processor 404A and/or special purpose processor 404B and a memory, such as random access memory (RAM) 406. The computer 402 is operatively coupled to a display 422, which presents images such as windows to the user on a graphical user interface 418B. The computer 402 may be coupled to other devices, such as a keyboard 414, a mouse device 416, a printer 428, etc. Of course, those skilled in the art will recognize that any combination of the above components, or any number of different components, peripherals, and other devices, may be used with the computer 402.

Generally, the computer 402 operates under control of an operating system 408 stored in the memory 406, and interfaces with the user to accept inputs and commands and to present results through a graphical user interface (GUI) module 418A. Although the GUI module 418B is depicted as a separate module, the instructions performing the GUI functions can be resident or distributed in the operating system 408, the computer program 410, or implemented with special purpose memory and processors. The computer 402 may also implement a compiler 412 which allows an application program 410 written in a programming language such as COBOL, C++, FORTRAN, or other language to be translated into processor 404 readable code. After completion, the application 410 accesses and manipulates data stored in the memory 406 of the computer 402 using the relationships and logic that was generated using the compiler 412. The computer 402 also optionally comprises an external communication device such as a modem, satellite link, Ethernet card, or other device for communicating with other computers.

In one embodiment, instructions implementing the operating system 408, the computer program 410, and the compiler 412 are tangibly embodied in a computer-readable medium, e.g., data storage device 420, which could include one or more fixed or removable data storage devices, such as a zip drive, floppy disc drive 424, hard drive, CD-ROM drive, tape drive, etc. Further, the operating system 408 and the computer program 410 are comprised of instructions which, when read and executed by the computer 402, causes the computer 402 to perform the operations herein described. Computer program 410 and/or operating instructions may also be tangibly embodied in memory 406 and/or data communications devices 430, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used. For example, the CCDs 102, or servers at the content providers 120, service providers 110 or advertising providers 140 may include processing systems 400 which exclude elements of FIG. 4, such as the GUI module 418A, compiler 412, display 422, keyboard 414 and printer 428.

CONCLUSION

This concludes the description of the preferred embodiments of the present disclosure.

The foregoing discloses an apparatus, method and system for measuring consumption of content data having content for serially presentation. In one embodiment, the method comprises generating n random numbers, where n>0; generating a first value $P_1$ at least in part from a cryptographic function of the n random numbers, publishing the first value $P_1$ to a smart contract associated with a blockchain, embedding consumption monitoring data including the n random numbers in different temporal locations of the content data, and transmitting the content data to a client device for consumption. The client device extracts each of the n random numbers only after a portion of the content data associated with a temporal location of the associated random number has been consumed, and transmits the extracted n random numbers to the smart contract associated with the blockchain. Further, the smart contract verifies that the transmitted extracted n random numbers match the embedded n random numbers from the published first value $P_1$ and a second value $P_2$ generated from the extracted n random numbers and executes a transaction of the smart contract only if the transmitted extracted n random numbers match the embedded n random numbers.

Implementations may include one or more of the following features:

Any of the methods described above, wherein the cryptographic function is a hash of a combination of the n random numbers.

Any of the methods described above, wherein the combination of the n random numbers is one of an exclusive OR of the n random numbers, a bitwise OR of the n random numbers, a bitwise AND of the n random numbers and a concatenation of the n random numbers.

Any of the methods described above, wherein the serially presented content data includes a transport stream including packets having an adaptation field; and each of the n random numbers are embedded as private data of the adaptation field.

Any of the methods described above, wherein the serially presented content is coded chunks according to an HLS protocol, and one of the n random number is included in each chunk.

Any of the methods described above, wherein the extracted n random numbers are transmitted only after all of the n random numbers associated with the content have been extracted.

Any of the methods described above, wherein the extracted n random numbers are securely transmitted.

Any of the methods described above, wherein the consumption monitoring data further includes a unique identifier of the content.

Another embodiment is evidenced by a system for measuring consumption of content data having content for serially presentation, including means for generating n random numbers, where n>0, means for generating a first value $P_1$ at least in part from a cryptographic function of the n random numbers, means for publishing the first value $P_1$ to a smart contract associated with a blockchain, means for embedding consumption monitoring data including the n random numbers in different temporal locations of the content data, means for transmitting the content data to a client device for consumption, a client device having means for extracting each of the n random numbers only after a portion of the content data associated with a temporal location of the associated random number has been consumed, and means for transmitting the extracted n random numbers to the smart contract associated with the blockchain. The system also includes means for verifying, that the transmitted extracted n random numbers match the embedded n random numbers from the published first value $P_1$ and a second value $P_1$ generated from the extracted n random numbers, and means for automatically executing a transaction of the smart contract only if the transmitted extracted n random numbers match the embedded n random numbers.

Implementations may include one or more of the following features:

Any system described above, wherein the cryptographic function is a hash of a combination of the n random numbers.

Any system described above, wherein the combination of the n random numbers is one of an exclusive OR of the n random numbers, a bitwise OR of the n random numbers, a bitwise AND of the n random numbers, and a concatenation of the n random numbers.

Any system described above, wherein the serially presented content data includes a transport stream including packets having an adaptation field, and each of the n random numbers are embedded as private data of the adaptation field.

Any system described above, wherein the serially presented content is coded chunks according to an HLS protocol, and one of the n random number is included in each chunk.

Any system described above, wherein the extracted n random numbers are transmitted only after all of the n random numbers associated with the content have been extracted.

Any system described above, wherein the extracted n random numbers are securely transmitted.

Any system described above, wherein the consumption monitoring data further includes a unique identifier of the content.

Another embodiment is evidenced by a system for measuring consumption of content data having content for serially presentation, including a content producer processor, and a content producer memory, communicatively coupled to the content producer processor, the content producer memory storing content producer processor instructions. The content producer instructions include instructions for generating n random numbers, where n>0, generating a first value $P_1$ at least in part from a cryptographic function of the n random numbers, publishing the first value $P_1$ to a smart contract associated with a blockchain, embedding consumption monitoring data including the n random numbers in different temporal locations of the content data. The system also includes a transmitter, for transmitting the content data to a client device for consumption. The client device has a client device processor, a client device memory, storing client device instructions including instructions for: extracting each of the n random numbers only after a portion of the content data associated with a temporal location of the associated random number has been consumed and transmitting the extracted n random numbers to the smart contract associated with the blockchain. The system also includes a verification processor, a verification memory, storing verification processor instructions including instructions for verifying, that the transmitted extracted n random numbers match the embedded n random numbers from the published first value $P_1$ and a second value $P_2$ generated from the extracted n random numbers, and automatically executing a transaction of the smart contract only if the transmitted extracted n random numbers match the embedded n random numbers.

Implementations may include one or more of the following features:

Any of the systems described above, wherein the cryptographic function is a hash of a combination of the n random numbers.

Any of the systems described above, wherein the combination of the n random numbers includes at least one of an exclusive OR of the n random numbers, a bitwise OR of the n random numbers, a bitwise AND of the n random numbers, and a concatenation of the n random numbers.

Any of the systems described above, wherein the serially presented content data includes a transport stream including packets having an adaptation field, and each of the n random numbers are embedded as private data of the adaptation field.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of measuring consumption of serially-presented content data, comprising:
   embedding consumption monitoring data in different temporal locations of the content data, the consumption monitoring data comprising random values by:
       generating n random numbers, where n>0; and
       embedding the consumption monitoring data comprising the n random numbers in the different temporal locations of the content data;
   transmitting the content data to a client device for consumption;
   generating a first value $P_1$ at least in part from a cryptographic function of the n random numbers; and
   publishing the first value $P_1$ to a smart contract associated with a blockchain; and wherein the client device:
       extracts the n random numbers only after a portion of the content data associated with a temporal location of the associated random numbers has been consumed; and
       transmits the extracted n random numbers to a smart contract associated with a blockchain;
   wherein the smart contract:
       verifies that the transmitted extracted n random numbers match the embedded random numbers from the published first value $P_1$ and a second value $P_2$ generated from the extracted n random numbers; and
       executes a transaction of the smart contract only if the n transmitted extracted random numbers match the n embedded random numbers.

2. The method of claim 1, wherein the cryptographic function is a hash of a combination of the n random numbers.

3. The method of claim 2, wherein the combination of the n random numbers is one of
   an exclusive OR of the n random numbers;
   a bitwise OR of the n random numbers;

a bitwise AND of the n random numbers; and
a concatenation of the n random numbers.

4. The method of claim 1, wherein:
the serially presented content data comprises a transport stream including packets having an adaptation field; and
each of the n random numbers are embedded as private data of the adaptation field.

5. The method of claim 1, wherein the serially presented content is coded chunks according to an HLS protocol, and one of the n random number is included in each chunk.

6. The method of claim 1, wherein the extracted n random numbers are transmitted only after all of the n random numbers associated with the content have been extracted.

7. The method of claim 1, wherein the extracted n random numbers are securely transmitted.

8. The method of claim 1, wherein the consumption monitoring data further comprises a unique identifier of the content.

9. A system for measuring consumption by at least one client device of serially-presented content data with embedded consumption monitoring data in different temporal locations of the content data, the consumption monitoring data comprising n random numbers, comprising a client device that:
extracts the n random numbers only after a portion of the content data associated with a temporal location of the associated random number has been consumed; and
transmits the extracted n random numbers to a smart contract associated with a blockchain;
wherein the smart contract:
verifies that the transmitted extracted n random numbers match the embedded n random numbers from a cryptographic function of the n random numbers and a published first value $P_1$ and a second value $P_2$ generated from the extracted n random numbers; and
executes a transaction of the smart contract only if the transmitted extracted n random numbers match the embedded n random numbers.

10. The system of claim 9, wherein the cryptographic function is a hash of a combination of the n random numbers.

11. The system of claim 10, wherein the combination of the n random numbers is one of
an exclusive OR of the n random numbers;
a bitwise OR of the n random numbers;
a bitwise AND of the n random numbers; and
a concatenation of the n random numbers.

12. The system of claim 9, wherein:
the serially presented content data comprises a transport stream including packets having an adaptation field; and
each of the n random numbers are embedded as private data of the adaptation field.

13. The system of claim 9, wherein the serially presented content is coded chunks according to an HLS protocol, and one of the n random number is included in each chunk.

14. The system of claim 9, wherein the extracted n random numbers are transmitted only after all of the n random numbers associated with the content have been extracted.

15. The system of claim 9, wherein the extracted n random numbers are securely transmitted.

16. The system of claim 9, wherein the consumption monitoring data further comprises a unique identifier of the content.

* * * * *